United States Patent [19]

Stebleton

[11] Patent Number: 4,719,276
[45] Date of Patent: Jan. 12, 1988

[54] NEUTRALIZATION OF CATALYST IN POLYMERIZATION OF POLYDIORGANOSILOXANE

[75] Inventor: Leo F. Stebleton, Midland, Mich.

[73] Assignee: Dow Corning Corporation, Midland, Mich.

[21] Appl. No.: 923,468

[22] Filed: Oct. 27, 1986

[51] Int. Cl.$^4$ .............................................. C08G 77/06
[52] U.S. Cl. ........................................ 528/24; 528/33; 528/37; 556/462; 556/467
[58] Field of Search ............................. 528/37, 14, 33; 556/462, 467

[56] References Cited

U.S. PATENT DOCUMENTS

| | | | |
|---|---|---|---|
| 4,177,200 | 12/1979 | Razzano et al. | 528/37 |
| 4,341,888 | 7/1982 | Razzano | 528/37 |
| 4,439,592 | 3/1984 | Maass et al. | 528/14 |
| 4,551,515 | 11/1985 | Herberg et al. | 528/18 |
| 4,609,749 | 9/1986 | Kotzsch et al. | 556/411 |

*Primary Examiner*—Melvyn I. Marquis
*Attorney, Agent, or Firm*—Edward C. Elliott

[57] ABSTRACT

A high molecular weight polydiorganosiloxane, produced by the alkaline catalysis of dialkylcyclotetrasiloxane, has a lower —SiOH content when the catalyst is neutralized with a composition of the formula $R'_3SiOC(O)R''$ where $R'$ is a hydrocarbon radical of from 1 to 6 carbon atoms inclusive and $R''$ is a hydrocarbon radical of from 1 to 8 carbon atoms inclusive.

6 Claims, No Drawings

NEUTRALIZATION OF CATALYST IN POLYMERIZATION OF POLYDIORGANOSILOXANE

BACKGROUND OF THE INVENTION

1. Field of the Invention

This invention is concerned with a method of neutralizing an alkaline catalyst used to polymerize polydiorganosiloxane.

2. Background Information

Diorganocyclosiloxane or linear polydiorganosiloxane is polymerized by heating with ring opening or condensation catalysts such as strong acids or bases. Among the most common alkaline catalysts are alkali metal compounds such as potassium hydroxide, sodium hydroxide, cesium hydroxide, and potassium silanolate. After polymerization, the alkaline catalyst is neutralized with a material such as trimethylchlorosilane, trichloroethyl phosphite, phosphorus pentoxide, silyl phosphate, acetic acid or carbon dioxide.

U.S. Pat. No. 4,439,592, issued Mar. 27, 1984, to Maass et al. teaches the preparation of polydiorganosiloxanes having terminal triorganosilyl groups. A process is described in which, before polymerization, part of the cyclic diorganosiloxane is distilled off in the presence of the polymerization catalyst at a temperature at least 10° C. below the temperature at which polymerization begins.

U.S. Pat. No. 4,551,515, issued Nov. 5, 1985, to Herberg et al. teaches that a mixture of cyclopolysiloxane monomers and chainstopping agents is preferably passed through a drying means to eliminate water from the mixture, because water will terminate or chainstop diorganopolysiloxane polymer with silanol groups and thus reduce the viscosity of the polymer and change the nature of its interaction with a filler. They further teach that after thorough neutralization of the catalyst after polymerization, the polymer can be devolatilized to remove volatiles such as unreacted cyclopolysiloxanes.

SUMMARY OF THE INVENTION

In the polymerization of polydiorganosiloxane using an alkaline catalyst such as potassium hydroxide or potassium silanolate, the use of $R_3SiOC(O)R'$ to neutralize the catalyst gives a polymer having less reactivity to reinforcing silica filler than does the use of neutralizing materials such as carbon dioxide or acetic acid.

DESCRIPTION OF THE INVENTION

This invention relates to a method of neutralizing the catalyst used in the alkaline polymerization of polydiorganosiloxane in which the neutralizing agent is a composition of the formula $R'_3SiOC(O)R''$, where $R'$ is a hydrocarbon radical of from 1 to 6 carbon atoms inclusive and $R''$ is a hydrocarbon radical of from 1 to 8 carbon atoms inclusive.

In the preparation of silicone elastomers, it is necessary to prepare polymers of high molecular weight. The preferred starting material is octamethylcyclotetrasiloxane. In basic polymerization, there are SiOH groups formed on the ends of some of the molecules because of the presence of the catalyst. For example, when the catalyst is potassium silanolate, it is thought that a number of molecules have $-R_2SiOK$ ends. When the catalyst is neutralized, these ends become $-R_2SiOH$. The purpose of this invention is the reduction or elimination in the number of these $-R_2SiOH$ ends.

Suitable cyclic siloxanes are of the general formula $(R_2SiO)_x$ where x is preferably 4, with minor amounts of silane where x is from 3 to 8 present as impurities. R is a substituted or unsubstituted alkyl or alkenyl hydrocarbon radical. Preferably R is selected from the group consisting of methyl, ethyl, phenyl, vinyl, and 3,3,3-trifluoropropyl radicals.

The chain length of the finished polymer is regulated by the addition of a chainstopping agent. Chainstopping agents are siloxanes having end groups of the formula $R^4_3Si-$ where $R^4$ is a substituted or unsubstituted alkyl or alkenyl hydrocarbon radical, preferably methyl or vinyl radical. Sufficient chainstopping agent is added so that there is the proper amount of endblocking available to equilibrate the polymerization at the desired average molecular weight.

A suitable basic polymerization catalyst is used to catalyze the polymerization process. Suitable catalysts are the alkali metal hydroxides or their corresponding siloxanolates, such as potassium hydroxide, sodium hydroxide, cesium hydroxide, potassium silanolate, sodium silanolate, and cesium silanolate, with potassium silanolate being preferred. The amount of catalyst is in the range of from 5 to 500 parts catalyst per million parts of diorganocyclosiloxane.

Polymerization of diorganocyclosiloxanes is carried out by mixing the diorganocyclosiloxane with chainstopping agent and with catalyst, then allowing the mixture to equilibrate, normally accelerating the equilibration by heating. Because any water or moisture present during the polymerization can end up as endblocking in the form of $-SiR_2OH$ groups, the polymerization is carried out at temperatures above 100° C. to remove any water from the reaction mixture. It is desirable to dry the ingredients before the polymerization is started by distilling off part of the ingredients or by exposing the ingredients to drying means such as molecular sieves. The polymerization can be a batch process or a continuous process. The polymerization is normally over a period of from a few minutes in the continuous processes to several hours in batch processes. The temperature is usually from 100° C. to 200° C. with temperatures from 150° C. to 180° C. preferred. A nitrogen sweep across the mixer contents is sometimes used in a batch process to remove volatile products from the mixture during polymerization.

After the polymerization mixture has equilibrated, the catalyst is neutralized. In the method of this invention, the catalyst is neutralized with a composition (composition C) of the formula $R'_3SiOC(O)R''$, where $R'$ is a hydrocarbon radical of from 1 to 6 carbon atoms inclusive and $R''$ is a hydrocarbon radical of from 1 to 8 carbon atoms inclusive. $R'$, for example, can be methyl, butyl, phenyl, or vinyl, with methyl preferred. $R''$, for example, can be methyl, ethyl, vinyl, phenyl, or octyl, with methyl preferred. Composition C can be made by adding $R'_3SiCl$ to $NaOC(O)R''$ in formamide and stirring, then allowing to separate into two layers. The upper layer is the product, which can be used without further purification. The preferred composition C is dimethylvinylsilylacetate, $(CH_3)_2(CH_3CH_2)SiOC(O)CH_3$. It is believed that the polydiorganosiloxane, during the polymerization process, has some endgroups of the formula $-SiR_2OK$ where K is the polymerization catalyst. When moisture is present or when the catalyst is neutralized with such things as dry ice or with acetic acid, the endgroup can react to form a —$SiR_2OH$ ended polymer. With the composition C of this invention, the endgroups react to form —$SiR_3$ ended polymer, which is the desired endgroup.

After the catalyst is neutralized, the mixture is heated, usually under vacuum, to remove the volatile materials, primarily the equilibrium diorganocyclosiloxanes.

The devolatilized polydiorganosiloxane produced is especially suitable for use in peroxide vulcanized silicone rubber having reinforcing silica present because the lower amount of -SiOH groups present in the polymer means that there is less interaction between the silica filler and the polymer. This interaction is thought to be responsible for the hardening of silica reinforced silicone rubber upon aging after manufacture, known in the industry as "crepe hardening".

The following example is included for illustrative purposes only and should not be construed as limiting the invention, which is properly set forth is the appended claims.

EXAMPLE

A series of polymerizations were carried out that were similar except for the fact that the composition used to neutralize the catalyst after polymerization was different in each case.

A high shear mixer having a jacket for heating and cooling was equipped with a soft metal gasket so that the mixing chamber could be sealed. The mixer was equipped with a sealable port through which ingredients could be added without opening the mixer. It also had a port through which gas could be added and an exhaust port to carry the gas and any volatile materials out of the chamber. This exhaust port was connected to a dew point meter to continuously monitor the dew point of the gas leaving the mixer chamber.

The mixer was sealed and heated to 100° C. and dry nitrogen was blown through the chamber until the dew point was −50° C. A mixture was prepared of 242 g of commercial dimethylcyclotetrasiloxane and 0.27 g of dimethylvinylsiloxy endblocked polydimethylsiloxane having about 5 dimethylsiloxane units per molecule and this mixture was injected into the mixer chamber. The water present in the ingredients was gradually swept out over a 30 minute period, at which time 0.36 g of a catalyst consisting of potassium silanolate having about 3.36 percent potassium (50 parts per million potassium based upon the weight of dimethylcyclotetrasiloxane) was injected and the steam pressure was raised to 70 psig (482 kPa). The mixture was allowed to polymerize for 2 hours, then was cooled to room temperature. The catalyst was neutralized by adding a quantity of ground dry ice to the mass in the mixer and mixing thoroughly. The neutralized material was devolatilized by heating the mixer with 175 psig (1206 kPa) steam and blowing an air stream over the surface of the mixing mass.

The amount of hydroxyl endblocking present in the completed polymer was judged by an activity test in which a sample of the polymer is dissolved in toluene, then mixed with ethylorthosilicate crosslinker and dibutyltindiacetate catalyst. This mixture is placed in a viscosity tube at a temperature of 25° C. and the viscosity measured at 10 minutes after catalyzation and at 20 minutes after catalyzation. The viscosity at the two times is then plotted on a chart and the slope of the line is determined. The procedure is repeated and the average of the two slopes is reported as the activity of the polymer. The higher the activity number, the more hydroxyl radical is present in the polymer. The activity is reported in the following Table.

A similar run was made but the catalyst was neutralized by the addition of 0.47 g of acetic acid ($CH_3COOH$). The activity is shown in the Table.

A third run was made, but the catalyst was neutralized with 0.51 g of dimethylvinylsilylacetate [$(CH_3)_2ViSiO$-$C(O)CH_3$].

TABLE

| Sample | Neutralizer | Activity |
| --- | --- | --- |
| 1 | $CO_2$ | 37 |
| 2 | $CH_3COOH$ | 42 |
| 3 | $(CH_3)_2ViSiOC(O)CH_3$ | 26 |

The results in the Table show that the use of the dimethylvinylsilylacetate gave a polymer which had a lower content of hydroxyl endblocking units as measured by the activity test.

That which is claimed is:

1. A method of neutralizing the catalyst used in the alkaline polymerization of diorganocyclosiloxane in which the neutralizing agent is a composition of the formula $R'_3SiOC(O)R''$, where $R'$ is a hydrocarbon radical of from 1 to 6 carbon atoms inclusive and $R''$ is a hydrocarbon radical of from 1 to 8 carbon atoms inclusive which comprises admixing the neutralizing agent with the catalyst.

2. A method of polymerizing diorganocyclosiloxane comprising
    (A) mixing a diorganocyclosiloxane of the formula $(R_2SiO)_x$ where R is selected from the group consisting of methyl, ethyl, phenyl, vinyl, and 3,3,3-trifluoropropyl, and x is from 3 to 5 inclusive with a catalytic amount of an alkaline polymerization catalyst,
    B. polymerizing the mixture until the desired molecular weight of the resulting polydiorganosiloxane is reached, and then
    (C) neutralizing the catalyst with the necessary amount of a composition of the formula $R'_3SiOC(O)R''$ where $R'$ is a hydrocarbon radical of from 1 to 6 carbon atoms inclusive and $R''$ is a hydrocarbon radical of from 1 to 8 carbon atoms inclusive.

3. The method of claim 1 in which $R'$ and $R''$ are methyl radicals.

4. A method of polymerizing diorganocyclosiloxane of the type in which diorganocyclosiloxane is mixed with a catalytic amount of an alkaline polymerization catalyst and polymerized until the desired molecular weight of the resulting polydiorganosiloxane is reached, whereinthe improvement comprises neutralizing the catalyst with the necessary amount of a composition of the formula $R'_3SiOC(O)R''$ where $R'$ is a hydrocarbon radical of from 1 to 6 carbon atoms inclusive and $R''$ is a hydrocarbon radical of from 1 to 8 carbon atoms inclusive.

5. The method of claim 2 in which $R'$ and $R''$ are methyl radicals.

6. The method of claim 4 in which $R'$ and $R''$ are methyl radicals.

* * * * *